United States Patent [19]

Patel et al.

[11] Patent Number: 4,904,482

[45] Date of Patent: Feb. 27, 1990

[54] CHEWING GUMS CONTAINING HYDRATED EMULSIFIER AND METHODS OF PREPARATION

[75] Inventors: Mansukh M. Patel, Downers Grove; Jayant C. Dave, Bloomingdale, both of Ill.

[73] Assignee: Wm. Wrigley Jr. Company, Chicago, Ill.

[21] Appl. No.: 289,806

[22] Filed: Dec. 22, 1988

[51] Int. Cl.$^4$ .............................................. A23G 3/30
[52] U.S. Cl. ......................................... 426/3; 426/654
[58] Field of Search ........................................ 426/3-6, 426/654

[56] References Cited

U.S. PATENT DOCUMENTS

| | | | |
|---|---|---|---|
| 2,197,718 | 4/1940 | Conner | 426/3 |
| 2,197,719 | 4/1940 | Conner | 426/3 |
| 3,984,574 | 10/1976 | Comollo | 426/3 |
| 4,088,788 | 5/1978 | Ream et al. | 426/3 |
| 4,157,402 | 6/1979 | Ogawa et al. | 426/3 |
| 4,493,849 | 1/1985 | Carroll et al. | 426/3 |
| 4,604,288 | 8/1986 | Glass et al. | 426/3 |
| 4,752,481 | 6/1988 | Dokuzovic | 426/3 |
| 4,786,491 | 11/1988 | Patel | 426/3 |

FOREIGN PATENT DOCUMENTS 55-19014 2/1980 Japan .

OTHER PUBLICATIONS 12 pages of material on lecithin published by Central Soya, "What is Lecithin?"
Three page letter captioned "Deoiled Lecithin in Chewing Gum Production".

*Primary Examiner*—Jeanette Hunter
*Attorney, Agent, or Firm*—Willian Brinks Olds Hofer Gilson & Lione

[57] ABSTRACT

Methods of producing gum and the resulting compositions, containing a hydrated emulsifier, are disclosed. In the preferred embodiment, 2 parts water and 1 part lecithin are blended together to form a gel. The gel is added to the gum composition, preferably after the gum base and the majority of the bulking and sweetening agents are mixed together. The use of a hydrated emulsifier improves initial softness and results in an extended shelf life.

13 Claims, No Drawings

CHEWING GUMS CONTAINING HYDRATED EMULSIFIER AND METHODS OF PREPARATION

BACKGROUND OF THE INVENTION

The present invention relates to chewing gum compositions and their methods of preparation. Particularly, the invention relates to the use of hydrated emulsifiers in making gum compositions.

The use of emulsifiers in chewing gum is common. Also, emulsifiers are used as part of other ingredients in chewing gum. For example, the use of emulsifiers in gum base gives the gum base the texture properties needed for consumer acceptance and for compatibility with other chewing gum ingredients. Various other uses of emulsifiers in chewing gum have been disclosed in several patents. In U.S. Pat. No. 4,157,402, an emulsifier is added to a liquid center of a center-filled chewing gum to inhibit flavor migration. In U.S. Pat. No. 4,493,849, lecithin is mixed with dicalcium phosphate, sugar and syrup to reduce chalkiness of the dicalcium phosphate. In U.S. Pat. No. 4,604,288, a lecithin liquid flavor premix is added to gum during manufacture to reduce bitterness of harsh flavor notes. In U.S. Pat. No. 4,752,481, an emulsion is added to anhydrous flavor to give long-lasting flavors, flavor stabilization and soft texture. In Japanese Patent Disclosure No. Sho 55-19014, an emulsifier is used in gum to enhance its non-sticking property.

SUMMARY OF THE INVENTION

It has been discovered that emulsifiers typically used to make chewing gum may be hydrated before their addition to the gum composition, and surprisingly the water used in such hydration remains bound in the gum, providing not only a softer initial texture, but an extended shelf life compared to similar compositions in which the water is either added by itself as an ingredient or is part of a plasticizer, such as corn syrup.

Thus the present invention includes gum composition that contain conventional ingredients such as gum base, bulking and sweetening agents, optional flavor and color, and an emulsifier which has been hydrated by mixing with water prior to its addition to the gum composition. The invention also includes methods of preparing such compositions.

DETAILED DESCRIPTION OF THE PREFERRED EMBODIMENTS OF THE INVENTION

As used herein, the term chewing gum includes bubble gum and other like variants of chewing gum.

Unless specified otherwise, all percentages herein are based on weight.

Gum composition formulas to which hydrated emulsifiers may be added pursuant to the present invention are conventional in other respects.

In general, a chewing gum composition typically comprises a water-soluble bulk portion, a water-insoluble chewing gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter Commonly employed waxes include paraffin, microcrystalline and natural waxes such as beeswax and carnauba. According to the preferred embodiment of the present invention, the insoluble gum base constitutes between 10 and 50 percent of the gum and more preferably between about 20 and 35 percent of the gum.

The gum base typically also includes a filler component. The filler component may be calcium carbonate, magnesium carbonate, talc, dicalcium phosphate or the like. The filler may constitute between about 5 and about 60 percent of the gum base. Preferably, the filler comprises about 5 to about 50 percent of the gum base.

Gum bases typically also contain softeners, including glycerol monostearate and glycerol triacetate. Further, gum bases may also contain optional ingredients such as antioxidants, colors, and emulsifiers (in addition to the hydrated emulsifier of the present invention). The present invention contemplates employing any commercially acceptable gum base.

The water-soluble portion of the chewing gum may further comprise softeners, sweetening and bulking agents, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent of the chewing gum. Softeners contemplated by the present invention include glycerin, lecithin (in addition to the lecithin which may be used to make the hydrated emulsifier of the present invention), and combinations thereof. Further, aqueous sweetener solutions such as those containing sorbitol, hydrogenated starch hydrolysates, corn syrup and combinations thereof may be used as softeners and binding agents in gum. According to the preferred embodiment of the present invention, such aqueous sweeteners constitute between 1 and 30 percent of the gum and more preferably between about 10 and 20 percent of the gum.

Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

Generally sugarless sweeteners include components with sweetening characteristics but which are devoid of the commonly known sugars and comprise, but are not limited to, sugar alcohols such as sorbitol, mannitol, xylitol, hydrogenated starch hydrolysates, maltitol and the like, alone or in any combination. The total amount of bulking and sweetening agents of the gum of the present invention constitutes between about 30 and 85 percent of the gum, preferably between about 40 and 70 percent of the gum.

A flavoring agent may be present in the chewing gum in an amount within the range of from about 0.1 to about 10.0 percent and preferably from about 0.5 to about 3.0 percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorally acceptable blend. All such flavors and flavor blends are contemplated by the present invention.

Optional ingredients such as colors and pharmaceutical agents may be added to the chewing gum. Other optional ingredients, including high-intensity sweeteners such as aspartame, alitame, sucralose, acesulfame K and saccharin, may be added to the chewing gum.

A most preferred composition of the present invention comprises from about 50–55% sugar, 18–22% gum base, 11–15% corn syrup, 1–2% glycerine, 9–11% dextrose, 0.5–1.5% flavor and 0.3–0.7% hydrated emulsifier, the hydrated emulsifier containing 60–70% water and 30–40% emulsifier.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color may also be added at this time. A softener such as glycerin may also be added at this time, along with syrup and a portion of the bulking agent. Further portions of the bulking agent may then be added to the mixer. A flavoring agent is typically added with the final portion of the bulking agent. In the preferred method, the hydrated emulsifier is added before the flavoring agent and before the final portion of the bulking agent.

The entire mixing procedure typically takes from five to fifteen minutes, but longer mixing times may sometimes be required. Those skilled in the art will recognize that many variations of the above described procedure may be followed.

In the present invention, the emulsifiers used in the gum composition is hydrated before it is mixed with the other gum composition ingredients.

Emulsifiers which may be used in the invention include diglyceride, glyceryl lacto palmitate, mono- and diglyceride, lecithin, sorbitan monostearate, triglycerol monostearate, triglycerol monoshortening, polysorbate 65, octaglycerol monoleate, polysorbate 60, polysorbate 80 and mixtures thereof. The hydrophilic lipophilic balance (HLB) of the emulsifier should be in the range of between 2 and 15. The most common and preferred emulsifier is lecithin. Lecithin is commercially available in paste and powder forms. The preferred lecithin for use in the present invention is a powdered lecithin with an HLB of between about 2 and 9, most preferably about 7.

The emulsifier is hydrated by mixing it with water. The ratio of water to emulsifiers will generally be in the range of about 3:1 to about 1:3. The range will depend on the emulsifier and its HLB. When lecithin is used, the preferred ratio is 2 parts water to 1 part lecithin.

If too much water is added, the gum will be too soft during manufacture, making it difficult to extrude, sheet, and wrap. During storage excess water may make the gum sweat in its package, causing the gum to stick to its wrapper. The preferred water content gives the best manufacture and texture properties.

The preferred procedure for making the hydrated emulsifier is to add 1 part powdered lecithin (Centrolex R from Central Soya Co.) to 2 parts water and mix with an agitator. For small quantities of a few hundred grams, mixing can be done with a spoon. In these small, hand mixed quantities, the mixing takes about ½ hour or until the lecithin disperses in the water and forms a gel. For larger quantities, a Hobart mixer can be used. The blend of water and lecithin should be mixed for about 20 minutes until the blend forms a gel.

Hydrated emulsifiers may be bacteriologically active. To reduce microbiological growth a preservative should be added, such as 0.1–1.0% sodium benzoate or parahydroxy benzoic acid.

A preferred formula for a sugar gum of the present invention is listed below as Example 1. Example 2 is a comparative example.

|  | Inventive Example 1 | Comparative Example 2 |
| --- | --- | --- |
| Sugar | 53.9 | 53.9 |
| Gum Base | 20.2 | 20.2 |
| Corn Syrup | 13.3 | 13.3 |
| Glycerin | 1.3 | 1.3 |
| Dextrose | 9.9 | 9.9 |
| Peppermint Flavor | 0.9 | 0.9 |
| Emulsifier/Water | 0.5[a] | 0.5[a] |

[a]contains 0.33% water and 0.17% lecithin (Centrolex R from Central Soya Co. - HLB = 7) blended together and added with the gum base at the beginning of the batch
[b]contains 0.33% water and 0.17% lecithin added to gum separately The gum was made by a standard procedure and sheeted as sticks.

The following examples are similar to Examples 1 and 2, except that a different emulsifier is used.

|  | Inventive Example 3 | Comparative Example 4 |
| --- | --- | --- |
| Sugar | 52.4 | 52.4 |
| Gum Base | 20.65 | 20.65 |
| Corn Syrup | 14.6 | 14.6 |
| Glycerin | 0.9 | 0.9 |
| Dextrose | 10.1 | 10.1 |
| Spearmint Flavor | 0.6 | 0.6 |
| Emulsifier/Water | 0.75[a] | 0.75[a] |

[a]contains 0.50% water and 0.25% octaglycerol monoleate (HLB = 13) blended together
[b]contains 0.50% water and 0.25% octaglycerol monoleate added to gum separately Sensory results showed samples from Examples 3 and 4 were the same except that the composition of Example 4 had moisture on the surface of the gum, and did not seem properly blended.

As indicated by Example 3 and 4, 0.5% of the gum composition was water added to the emulsifier. At present, it is estimated that the highest possible level of water added via the hydrated emulsifier is about 0.5% of the total gum composition. The preferred level of hydrated emulsifier in the gum is thus between about 0.1 and 2%.

Hydrated lecithin can also be used in sugarless gum formulations and will give improved texture and shelf life. However, in low moisture sugarless gum, more moisture would make the gum too soft for manufacture and chewing. In high moisture gum, use of hydrated emulsifier could give a shelf-life stability advantage.

| Examples | Example 5 High Moisture | Example 6 With Lycasin | Example 7 Low Moisture |
|---|---|---|---|
| Gum Base | 25.5 | 25.5 | 25.5 |
| Sorbitol | 53.6 | 49.3 | 52.1 |
| Mannitol | 8.0 | 8.0 | 12.0 |
| Lycasin | — | 6.8 | — |
| Sorbitol Liquid | 9.5 | — | — |
| Glycerin | 1.5 | 8.5 | 8.5 |
| Flavor | 1.5 | 1.5 | 1.5 |
| Hydrated Lecithin* | 0.5 | 0.5 | 0.5 |

*Hydrated lecithin contains 0.33% water and 0.17% lecithin preblended

Storage tests at a low relative humidity (RH) were conducted with gums made by Examples 1 and 2 and a gum (Example 8) made with the formula of Example 1 except that the hydrated emulsifier was added after the sugar, gum base, corn syrup and glycerin were added but before the dextrose and flavor.

The gums of Examples 1, 2 and 8 were sheeted as sticks, and stored at 75° F. and 20% RH to determine their differences in low RH tests. The sticks were not wrapped in any fashion.

A Tabor test machine which measures stiffness of stick gum was used to determine stick stiffness at 0, 4, 10, and 17 days. The results were as follows:

| | Days | | | |
|---|---|---|---|---|
| | 0 | 4 | 10 | 17 |
| Example 1 | 30.7 | 73.3 | 92.0 | 101.3 |
| Example 2 | 34.7 | 88.7 | 105.3 | 120.0 |
| Example 8 | 24.3 | 71.0 | 89.3 | 88.0 |

These results, an average of 3 readings, demonstrate that by adding a hydrated emulsifier blend directly to gum the gum is softer initially and remains softer for an extended period of time. Also, adding the blend near the end of mixing appears to give slightly better softness than adding it with the gum base.

It is theorized that about 3–5% water is unbound in gum when it is added as corn syrup. This water is released as the gum dries out. Water and lecithin each have an effect in giving gum a softer texture, but when water is first added to hydrate the lecithin before the lecithin is mixed into the gum, the water becomes bound in the gum to such an extent so as to significantly reduce the rate at which the water evaporates from the gum composition Thus, the gum can stay softer for a longer time, improving its shelf-life. It is believed that because gum base is lipophilic, it attracts the emulsifier which has the water bound to it via the hydration Thus the water used in the hydration is held in the gum by the base-emulsifier combination.

It is thought that the discovery of the present invention may have use in other confections Although emulsifiers are not generally used in hard candy, the addition of hydrated lecithin may improve their shelf-life. Hydrated lecithin may also be used to reduce the fat content of caramels and nougats.

The above preferred methods and compositions are provided by way of illustration. Modifications may be made without departing from the present invention. It is therefore intended that the following claims describe the scope of the invention.

We claim:

1. In a method of producing a chewing gum composition comprising about 10% to about 50% gum base, about 30% to about 85% bulking and sweetening agents, about 0.1 to about 1.5% emulsifier and optional flavor and color, the improvement comprising:

hydrating at least a portion of said emulsifier by mixing said portion of the emulsifier with water at a ratio of between about 3:1 and about 1:3 and forming a gel with the water prior to mixing said hydrated portion of the emulsifier with the remaining gum ingredients to thereby provide the gum with the water used to hydrate the emulsifier in a bound form to improve the shelf life softness of the gum.

2. The improved method of claim 1 wherein the emulsifier is selected from the group consisting of glyceryl lacto palmitate, mono- and diglyceride, lecithin, sorbitan monostearate, triglycerole monostearate, tryglcerol monoshortening, polysorbate 65, octaglycerol monoleate, polysorbate 60, polysorbate 80, diglyeride and mixtures thereof.

3. The improved method of claim 1 wherein the emulsifier comprises lecithin and the ratio of water to lecithin in the hydrated emulsifier is about 2:1.

4. The improved method of claim 1 wherein the hydrated emulsifier is mixed into the composition after the gum base and the majority of the bulking and sweetening agents are mixed together.

5. A chewing gum composition comprising about:
   10 to 50% gum base;
   30 to 85% sweetening and bulking agents;
   1 to 30% corn syrup;
   0.5 to 15% glycerine;
   0.1 to 10% flavor; and
   0.1 to 2% of hydrated emulsifier, containing emulsifier and water in a ratio of between about 3:1 and 1:3.

6. The chewing gum composition of claim 5 wherein the emulsifier is selected from the group consisting of glyceryl lacto palmitate, mono- and diglyceride, lecithin, sorbitan monostearate, triglycerole monostearate, tryglcerol monoshortening, polysorbate 65, octaglycerol monoleate, polysorbate 60, polysorbate 80, diglyceride and mixtures thereof.

7. The chewing gum composition of claim 5 wherein the emulsifier has an HLB of from about 2 to about 15.

8. The chewing gum composition of claim 5 wherein the bulking and sweetening agents are selected from the group consisting of sugar, sorbitol, mannitol, xylitol, dextrose, fructose, corn syrup solids, and mixtures thereof.

9. The chewing gum composition of claim 5 wherein the emulsifier comprises lecithin and the ratio of water to lecithin in the hydrated emulsifier is about 2:1.

10. The chewing gum composition of claim 5 comprising about
   50–55% sugar;
   18–22% gum base;
   11–15% corn syrup;
   1–2% glycerin;
   9–11% dextrose;
   0.5–1.5% flavor and
   0.3–0.7% hydrated emulsifier; and wherein the hydrated emulsifier comprises about 60–70% water and 30–40% emulsifier.

11. The composition of claim 10 wherein the emulsifier comprises lecithin with an HLB of about 7.

12. The composition of claim 11 wherein the hydrated emulsifier comprises about 0.5% of the gum composition.

13. The composition of claim 13 wherein the ratio of water to lecithin is about 2:1.

* * * * *

UNITED STATES PATENT AND TRADEMARK OFFICE
CERTIFICATE OF CORRECTION

PATENT NO. : 4,904,482
DATED : February 27, 1990
INVENTOR(S) : Mansukh M. Patel et al.

Page 1 of 2

It is certified that error appears in the above-identified patent and that said Letters Patent is hereby corrected as shown below:

In column 1, line 40, please delete "composition" and substitute therefor --compositions--.

In column 2, line 5, after "butter" please insert --,--.

In column 3, line 41, please delete "emulsifiers" and substitute therefor --emulsifier--.

In column 4, line 28, in the table under the heading "Example 2" please delete "$0.5^a$" and substitute therefor --$0.5^b$--.

In column 4, line 29, in footnote "$a$" please delete "Controlex" and substitute therefor "Centrolex--.

In column 4, line 47, in the table under the heading "Example 4" please delete "$0.75^a$" and substitute therefor --$0.75^b$--.

In column 4, line 55, please delete "Example" and substitute therefor --Examples--.

In column 5, line 48, after "composition" please insert --,--.

UNITED STATES PATENT AND TRADEMARK OFFICE
CERTIFICATE OF CORRECTION

PATENT NO. : 4,904,482
DATED : February 27, 1990
INVENTOR(S) : Mansukh M. Patel et al.

It is certified that error appears in the above-identified patent and that said Letters Patent is hereby corrected as shown below:

In column 5, line 51, after "hydration" please insert --.--; and after "Thus" please insert --,--.

In column 5, line 55, after "confections" please insert --.--.

In claim 2, column 6, line 16, please delete "diglyeride" and substitute therefor --diglyceride--.

In claim 10, column 6, line 57, after "flavor" please insert --;--.

Signed and Sealed this

Twenty-third Day of June, 1992

Attest:

DOUGLAS B. COMER

*Attesting Officer*    Acting Commissioner of Patents and Trademarks

UNITED STATES PATENT AND TRADEMARK OFFICE
CERTIFICATE OF CORRECTION

PATENT NO. : 4,904,482
DATED : February 27, 1990
INVENTOR(S) : Mansukh M. Patel et al.

It is certified that error appears in the above-identified patent and that said Letters Patent is hereby corrected as shown below:

In column 1, line 40, please delete "composition" and substitute therefor --compositions--.

In column 2, line 5, after "butter" please insert --.--.

In column 3, line 41, please delete "emulsifiers" and substitute therefor --emulsifier--.

In column 4, line 28, in the table under the heading "Example 2" please delete "$0.5^a$" and substitute therefor --$0.5^b$--.

In column 4, line 29, in footnote "$a$" please delete "Controlex" and substitute therefor "Centrolex--.

In column 4, line 47, in the table under the heading "Example 4" please delete "$0.75^a$" and substitute therefor --$0.75^b$--.

In column 4, line 55, please delete "Example" and substitute therefor --Examples--.

In column 5, line 48, after "composition" please insert --.--.

UNITED STATES PATENT AND TRADEMARK OFFICE
CERTIFICATE OF CORRECTION

PATENT NO. : 4,904,482

DATED : February 27, 1990

INVENTOR(S) : Mansukh M. Patel et al.

It is certified that error appears in the above-identified patent and that said Letters Patent is hereby corrected as shown below:

In column 5, line 51, after "hydration" please insert --.--; and after "Thus" please insert --,--.

In column 5, line 55, after "confections" please insert --.--.

In claim 2, column 6, line 16, please delete "diglyeride" and substitute therefor --diglyceride--.

In claim 10, column 6, line 57, after "flavor" please insert --;--.

UNITED STATES PATENT AND TRADEMARK OFFICE
CERTIFICATE OF CORRECTION

PATENT NO. : 4,904,482

DATED : February 27, 1990

INVENTOR(S) : Mansukh M. Patel et al.

It is certified that error appears in the above-identified patent and that said Letters Patent is hereby corrected as shown below:

In claim 12, column 6, line 63, please delete "11" and substitute therefor --10--.

In claim 13, column 6, line 66, please delete "13" and substitute therefor --12--.

This certificate supersedes Certificate of Correction issued June 23, 1992.

Signed and Sealed this

Twenty-seventh Day of October, 1992

*Attest:*

DOUGLAS B. COMER

*Attesting Officer*      *Acting Commissioner of Patents and Trademarks*